US005450121A

United States Patent [19]

Adams

[11] Patent Number: 5,450,121

[45] Date of Patent: Sep. 12, 1995

[54] MARGIN CONTROL FOR LASER PRINTERS

[75] Inventor: Gregory K. Adams, Tomball, Tex.

[73] Assignee: Compaq Computer Corporation, Houston, Tex.

[21] Appl. No.: 811,800

[22] Filed: Dec. 20, 1991

[51] Int. Cl.[6] .................. G01D 9/42

[52] U.S. Cl. .................. 347/250

[58] Field of Search .......... 346/108, 160, 1.1, 107 A, 346/140 R; 354/9; 358/302, 409, 410, 412; 347/9, 37, 116, 129, 248, 249, 250

[56] References Cited

U.S. PATENT DOCUMENTS

| | | | |
|---|---|---|---|
| 3,555,558 | 1/1971 | Sherman | 347/37 X |
| 3,803,628 | 4/1974 | Van Brimer et al. | 346/1.1 |
| 3,971,044 | 7/1976 | Findley et al. | 354/9 |
| 4,251,825 | 2/1981 | Mikami et al. | 346/160 |
| 4,265,556 | 5/1981 | Krieg et al. | 400/342 |
| 4,364,062 | 12/1982 | Matsui | 346/75 |
| 4,609,925 | 9/1986 | Nozu et al. | 346/1.1 |
| 4,663,523 | 5/1987 | Swanberg | 358/293 X |
| 4,893,135 | 1/1990 | Jamzadeh | 346/108 |
| 4,897,675 | 1/1990 | Negishi | 346/160 X |
| 4,962,981 | 10/1990 | Murakami et al. | 358/296 X |
| 4,975,626 | 12/1990 | Yagi et al. | 346/160 X |
| 5,081,477 | 1/1992 | Gibson | 346/160 |
| 5,210,547 | 5/1993 | Watanabe et al. | 346/76 PH |
| 5,262,801 | 11/1993 | Serizawa | 346/108 |

FOREIGN PATENT DOCUMENTS

| | | |
|---|---|---|
| 0012881 | 7/1980 | European Pat. Off. . |
| 2290306 | 6/1976 | France . |

*Primary Examiner*—Benjamin R. Fuller
*Assistant Examiner*—Randy W. Gibson
*Attorney, Agent, or Firm*—Vinson & Elkins

[57] ABSTRACT

Circuitry for controlling the margin of a laser printer is provided which times a preset margin on a first scanline of a page at high frequency for high accuracy. Thereafter, subsequent scanlines on the page are positioned responsive to the count generated responsive to the preset margin. Hence, the laser may be directly modulated at speeds higher than the standard frequency without a reduction in the relative accuracy of the margin.

36 Claims, 4 Drawing Sheets

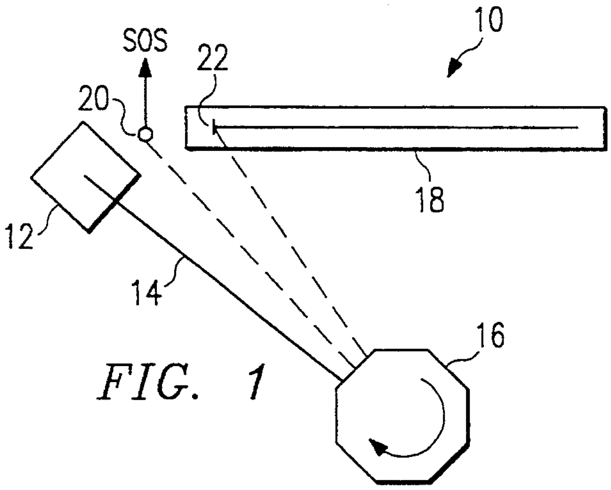
FIG. 1
FIG. 2a
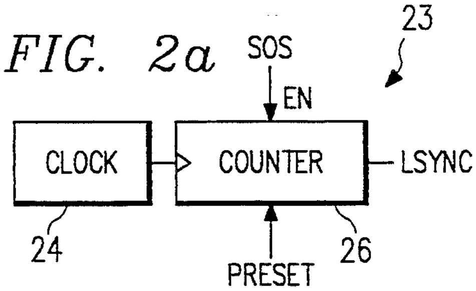
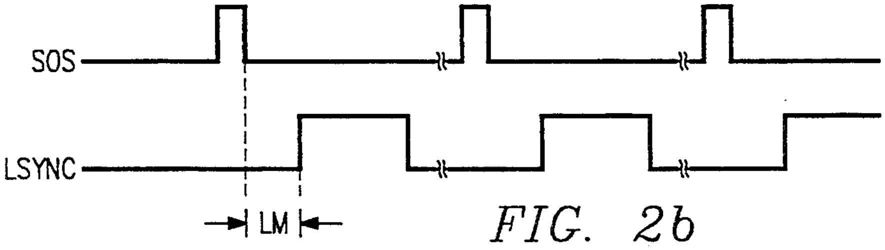
FIG. 2b
FIG. 2c
(PRIOR ART)
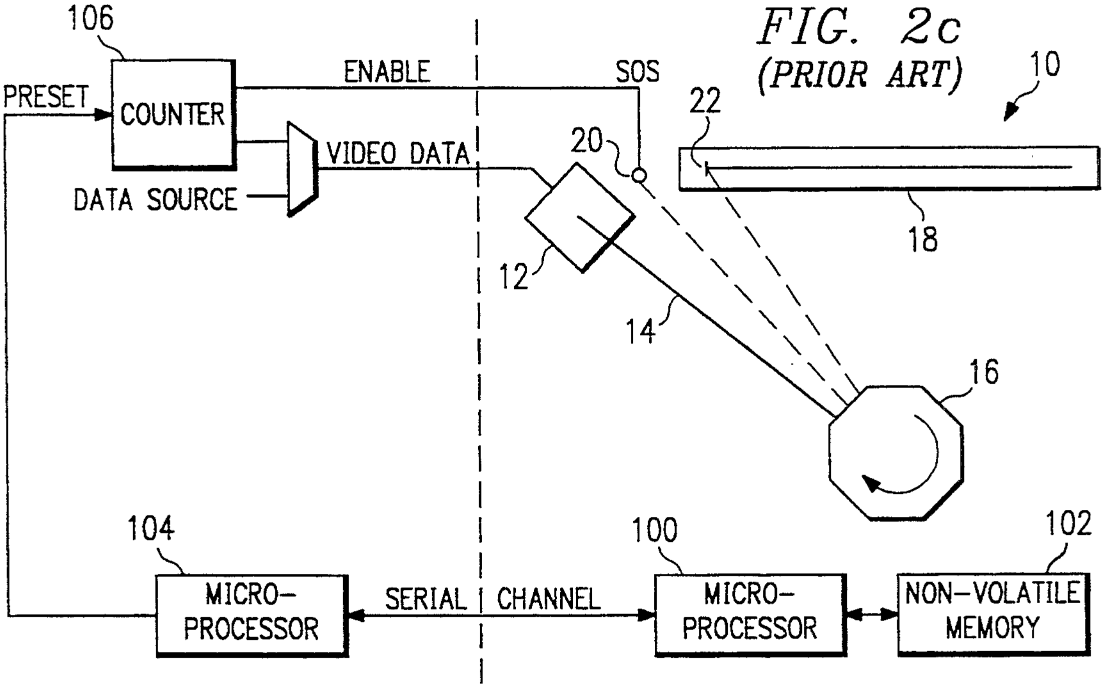

MARGIN CONTROL FOR LASER PRINTERS

TECHNICAL FIELD OF THE INVENTION

This invention relates in general to computer peripherals, and more particularly to a method and device for accurately and automatically locating margins produced by a laser printer.

BACKGROUND OF THE INVENTION

Laser printers form an image on paper similar to that of a photocopy device. A photocopy device forms an image on a print drum by exposing chemicals on the drum to a light source. The chemicals are then washed off, except in the regions of exposure. The exposed regions will pick up ink and transfer the ink to paper which is pressed against the drum.

A laser printer exposes an electrically charged drum which is permanently coated with a photosensitive insulator. The exposed regions electrically attract particles of ink or "toner". This toner is then transferred to paper by applying a charge to the paper causing the toner to move from the drum to the paper.

Typically, laser printers are designed around a print engine manufactured by a third party. The basic components of the print engine are the laser, a drum, and a rotating mirror which directs the laser beam in a straight line across the drum (the "scanline"). In order to generate the image, the laser beam is pulsed on and off as desired while the mirror rotates to expose dots on the drum.

Importantly, each print engine is adjusted at the factory to ensure that the first dot on each scanline is precisely aligned. In most cases, the laser scans across the drum from left to right; however, the alignment problem exists regardless of the direction of the scanning. In order to align the first dots on each scanline, a sensor placed to the left of the drum detects the laser beam prior to the beginning of the scan. Once the laser beam is detected by the sensor, the beam is disabled for a predetermined number of clock cycles. When the predetermined number of clock cycles have expired, the laser is enabled to begin pulsing to form the image across the scanline. The distance between the sensor and the start of printing is referred to as the "margin". It should be noted that the number of clock cycles between sensing the laser beam and enabling the laser will vary depending upon the paper size. Accordingly, a number of predetermined margins are supported by the engine to accommodate various standard paper sizes.

Each print engine is tuned at the factory, by adjusting the number of clock cycles of delay after sensing the beam, such that the left margin will typically be accurate within $\frac{1}{4}$ of a dot using the print engine standard frequency. Thus, for a 300-dot per inch print engine, the left margin will be accurate within 1/1200th of an inch.

Many print engines also allow direct control of the modulation frequency of the laser beam, thereby determining the resolution of the printer. For example, for a 300-dot per inch laser print engine, doubling the modulation frequency of the laser would result in a scanline resolution of 600-dot per inch. However, alignment of the left margin is accurate only within $\frac{1}{4}$ dot at the standard frequency. Thus, for a 300-dot per inch engine, the accuracy of the left margin is within $\frac{1}{4}$ of a 300 dpi dot, or $\frac{1}{2}$ of a 600 per inch dot. Consequently, while the print engine is controlled externally at a higher frequency, the relative accuracy of the margin control will suffer.

A current method of externally controlling the left margin requires that the engine communicate, via a serial communications channel, the number of dots for the margin. This value is typically stored in non-volatile memory inside the print engine. This data is determined for each engine at the time of manufacture. The engine, when requested, transmits this information to the controller. The controller then replicates the margin at the desired resolution ensuring precise margin placement. This process, however, requires that the controller microprocessor and the engine microprocessor communicate this information for each page. This consumes hardware resources and slows the controller microprocessor in its main task of generating the image in memory.

Thus, a need has arisen in the industry to provide an accurate, automatic method and device for determining an accurate margin in a laser printer.

SUMMARY OF THE INVENTION

In accordance with the present invention, a method and apparatus is provided for accurately defining a margin in a print engine. Sensing circuitry in the print engine senses the engine's print medium at a first location on a scanline and generates a first signal responsive thereto. The time between the first signal and movement of the print medium to a second location on the scanline is measured. Thereafter, for each scanline, a control signal to enable printing is generated after receiving the first signal and waiting for the measured elapsed time to expire.

The present invention provides significant advantages over the prior art. Because the initial margin is timed at a high accuracy, the alignment of the margin will be accurate within a predetermined error margin relative to the scan rate. Thus, the print engine may be modulated at a various frequencies without affecting the accuracy of the margins. In addition, the accurate placement of the margin is done without intervention by the engine or controller microprocessors, thus allowing faster overall operation of the printer as a whole.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a schematic representation of the major components of a print engine;

FIG. 2*a* illustrates a margin setting circuitry used in the print engine of FIG. 1;

FIG. 2*b* is a timing diagram illustrating the signals generated by the margin setting circuit of FIG. 2*a;*

FIG. 2*c* shows a block diagram of a current circuit for alignment of left margin;

DETAILED DESCRIPTION OF THE INVENTION

Figure 3A:
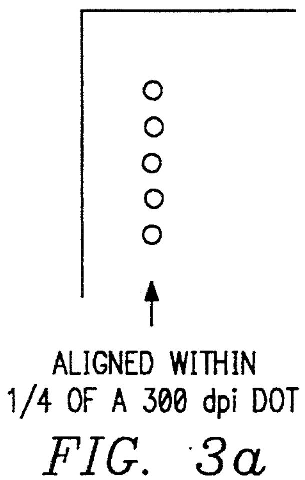
FIGS. 3*a–c* illustrate page layouts demonstrating the problems associated with operating the print engine of FIG. 1 at a high scan rate.

The preferred embodiment of the present invention and its advantages are best understood by referring to FIGS. 1–7 of the drawings, like numerals being used for like and corresponding parts of the various drawings.

FIG. 1 illustrates a schematic representation of the major components of a laser print engine 10. Print engine 10 comprises laser 12 which reflects beam 14 off rotating mirror 16 onto drum 18. In the illustrated embodiment, mirror 16 rotates such that beam 14 scans from left to right across drum 18. Prior to impinging drum 18, the reflected beam 14 impinges sensor 20. Responsive to sensing the reflected laser beam 14, sensor 20 outputs control signal (SOS). The SOS signal signifies that the reflected beam 14 has reached a predetermined position in its path. From this predetermined position, the left margin 22 (the lateral position on the drum 18 at which printing begins) may be determined.

FIGS. 2*a–b* illustrate the print engine's circuitry 23 for setting the left margin 22, and timing diagrams of the signals generated thereby, respectively. In FIG. 2*a*, a clock 24 decrements a counter 26 which has been previously set to a predetermined count. The counter is enabled upon the trailing edge of the SOS signal. The laser beam is disabled responsive to the SOS signal. When the counter reaches zero, a line sync (LSYNC) signal is output. On the leading edge of the LSYNC signal, the laser 12 is enabled such that printing to the drum 18 may begin. As shown in FIG. 2*b*, LM represents the time that it takes the reflected laser beam to rotate from the sensor 20 to the desired left margin 22. It should be noted that the position of the desired left margin 22 may vary depending upon the paper size being used.

FIG. 2*c* illustrates prior art circuitry for generating the left margin externally from the print engine. The print engine microprocessor 100 retrieves a number from non-volatile memory 102 indicating the number of dots for the left margin. This information is sent to the controller microprocessor 104 via a serial channel. The controller microprocessor 104 loads the information to the counter 106 which replicates the left margin at the desired resolution. This process must be repeated for each page. This circuitry places an additional burden on the controller microprocessor 104, reducing the performance of its main task of generating the image in memory.

Figure 3B:
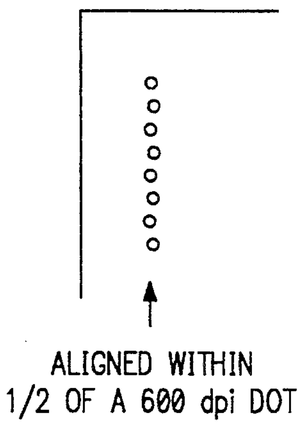
Figure 3C:
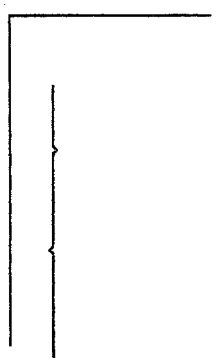

FIGS. 3*a–c* illustrate the problems with operating the print engine of FIG. 1 at a higher frequency to obtain a higher print resolution. In FIG. 3*a*, each dot at the left margin is aligned within $\frac{1}{4}$ of a dot at the standard frequency of the print engine. However, as shown in FIG. 3*b*, at twice the frequency (and hence, twice the resolution), the margin setting circuit of FIG. 2*a* aligns the higher resolution dots within $\frac{1}{4}$ dot of a standard frequency dot. At twice the standard frequency, the dots will be aligned only within $\frac{1}{2}$ of the higher resolution dot. The resultant effect is illustrated in FIG. 3*c* wherein a vertical line will appear to have perturbations along its length where one or more dots are misaligned.

Figure 4:
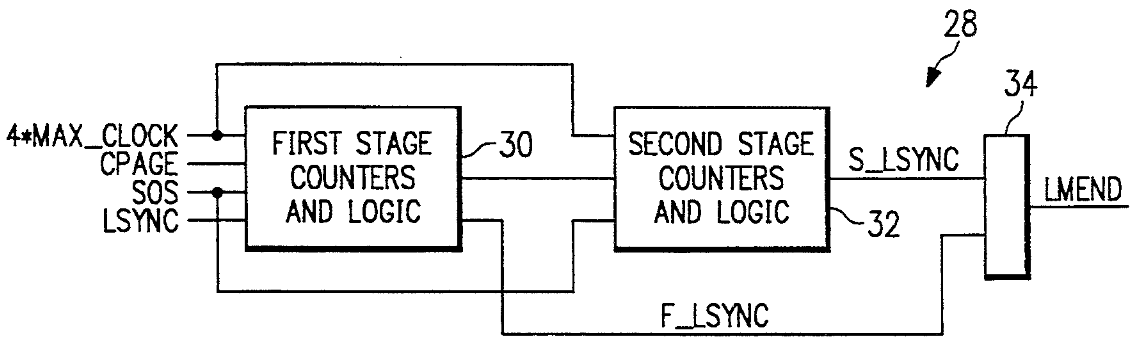
FIG. 4 illustrates a block diagram of the margin setting circuit of the present invention for providing accurate margin placement at a higher scan rates.

FIG. 4 illustrates a margin control circuit 28 which operates in conjunction with a print engine 10 to provide accurate margin settings without intervention of the engine microprocessor or controller microprocessor. The margin control circuit 28 receives four control signals: LSYNC and SOS from the margin setting circuit 23 of the laser print engine 10, CPAGE, which is received from the print engine and indicates the start of a new page, and 4*MAX_CLOCK which is generated external from the print engine. The 4*MAX_CLOCK signal is a clock which is set to four times the frequency for a given resolution. For example, if a 15 kHz clock signal is used for 300 dpi resolution, then a clock signal of 30kHz would be used for 600 dpi resolution. The 4*MAX_CLOCK signal would then be set to 120 kHz. The four control signals are input to first stage counter and logic circuitry 30. The output of first stage counter and logic circuitry 30 is input to the second stage counter and logic circuitry 32 along with the 4*MAX_CLOCK and SOS control signals. F_LSYNC, representing LSYNC for the first scanline of a page is output from first stage counter and logic circuitry 30 to laser control logic 34. The output of second stage counter and logic circuitry 32 (S_LSYNC), representing the start of each subsequent scanline, is input to logic 34, along with the F_LSYNC signal. The output of logic 34 is the LMEND signal, which enables the laser 12 to start printing.

Figure 5:
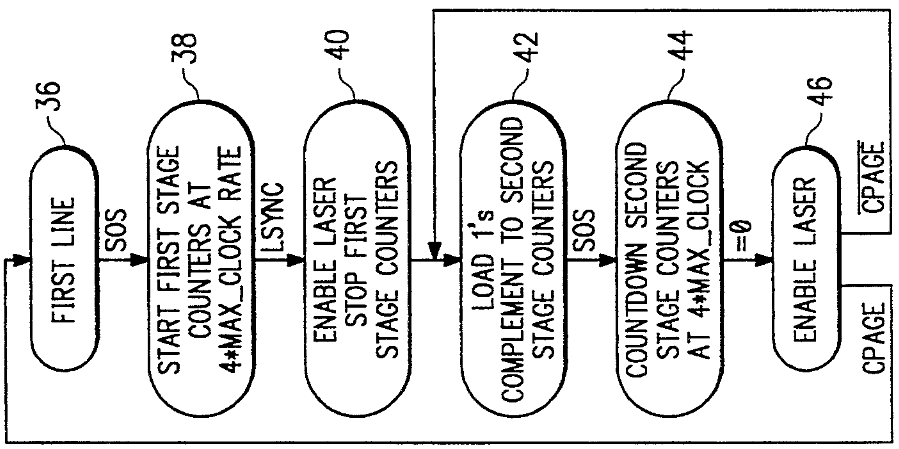
FIG. 5 illustrates a state diagram describing operation of the circuit of FIG. 4.

Operation of the margin control circuit 28 is described in connection with the state diagram of FIG. 5. When the CPAGE signal indicates that a new page has been encountered, the margin control circuit 28 transitions to state 36, indicative of placement at the first line of a new page. On receiving the SOS signal, indicating that the beam has impinged sensor 20, the margin control circuit 28 transitions to state 38. In state 38, the first stage counters are incremented at the 4*MAX_CLOCK frequency. The counters are incremented until receiving the LSYNC signal from the laser print engine 10. Hence, in state 38, the first stage counters have timed the interval between SOS and LSYNC at a resolution of four times the frequency which will be used to control the laser 12.

On receiving the LSYNC signal from the print engine 10, the first stage counters are stopped and the F_LSYNC signal is enabled (state 40). For the first scan of a new page, logic 34 passes the F_LSYNC signal to the laser 12 to enable printing. The 1's complement of the number derived by the first stage counters is loaded into the second stage counters 32 in state 42. Upon receiving the SOS signal, indicating that the laser has impinged the sensor 20 on the second scan, the second stage counters 32 are incremented responsive to the 4*MAX_CLOCK signal (state 44). When the second stage counters reach zero, the S_LSYNC signal transitions high. For the second and subsequent scans, the logic 34 passes the S_LSYNC signal to the laser 12. Hence, when the second stage counters reach zero, the laser is enabled in state 46. While CPAGE is low, the second stage counters will be reloaded with the 1's complement of the number derived by the first stage counters in state 42. Hence, each scan subsequent to the first scan will use the second stage counters to determine the left margin. The cycle between states 42, 44 and 46 will continue until CPAGE transitions high, indicating a new page. At this point, the margin control circuit 28 will return to state 36.

Hence, the margin control circuit 28 uses the factory set margin of the laser print engine 10 to define the left margin on the first scan. All subsequent scans will begin within $\frac{1}{4}$ dot (at the frequency driving the laser) of the margin set on the first scan. Hence all dots in a vertical line will be aligned within $\frac{1}{4}$ dot, regardless of the frequency used to modulate the laser.

Figure 6:
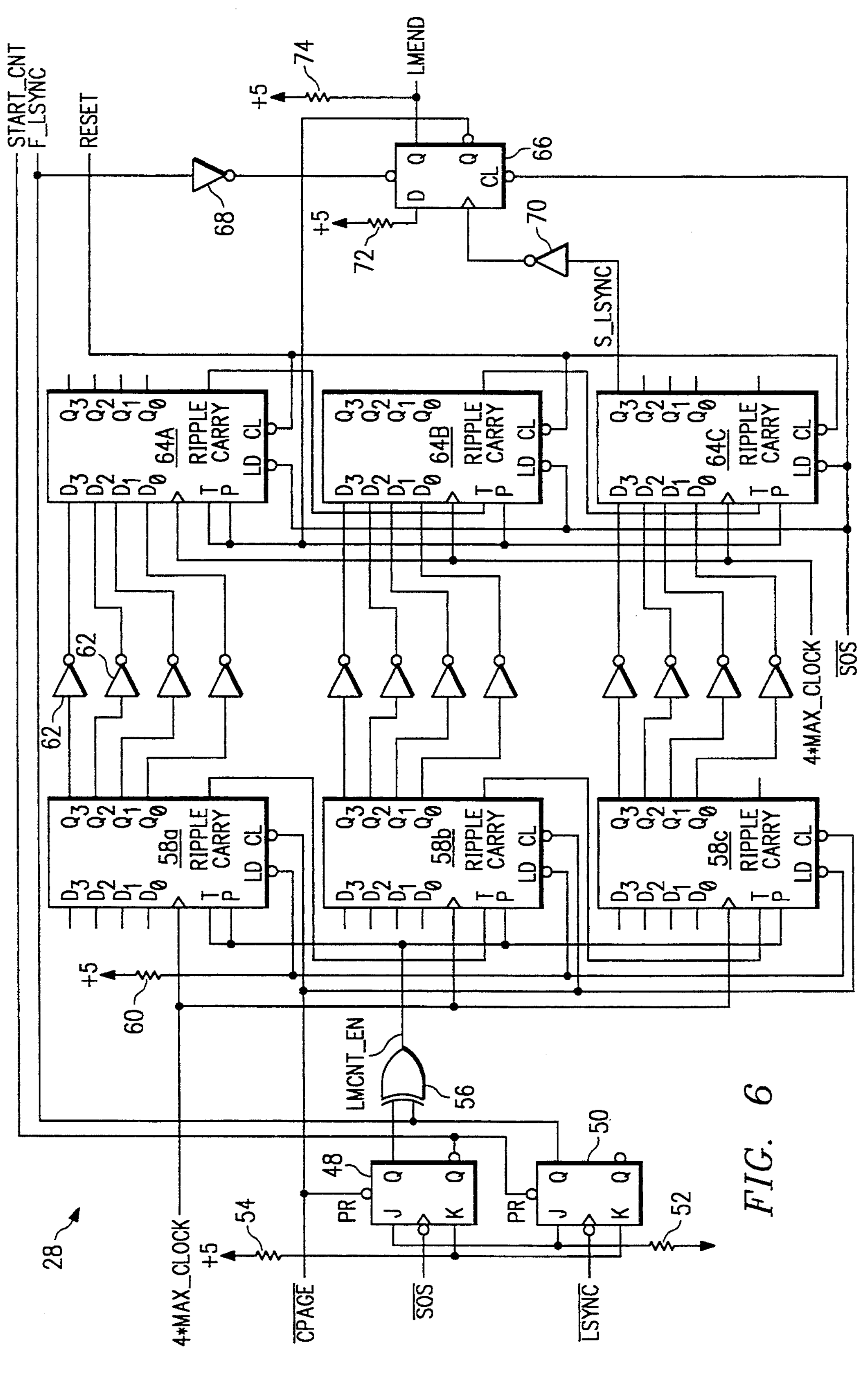
FIG. 6 illustrates a detailed schematic representation of the circuit of FIG. 4.

FIG. 6 illustrates a detailed block diagram of a preferred embodiment for implementing the margin control circuit 28. J-K flip-flops 48 and 50 have clock inputs coupled to the SOS and LSYNC signals, respectively. The J inputs of the flip-flops 48 and 50 are coupled to ground via pull-down resistor 52 and K inputs are coupled to $V_{cc}$ via pull-up resistor 54. The preset input of J-K flip-flop 48 is coupled to the $\overline{CPAGE}$ signal. The $\overline{Q}$ output of flip-flop 48 is coupled to the preset input of flip-flop 50. The Q outputs of the flip-flops 48 and 50 are coupled to the inputs of an XOR gate 56. The Q output of flip-flop 48 is referred to as the START_CNT signal and the Q output of flip-flop 50 is referred to as the F_LSYNC signal. Counters 58*a–c* are coupled such that the ripple carry output of counter 58*a* is coupled to the T input of counter 58*b* and the ripple carry output of counter 58*b* is coupled to the T input of counter 58*c*. The output of the XOR gate 56 (the LMCNT_EN signal) is coupled to the T and P inputs of counter 58*a*, and the P inputs of counters 58*b* and 58*c*. The CPAGE signal is coupled to the CLEAR inputs of the counters 58*a–c* The 4*MAX_CLOCK signal is coupled to the clock inputs of the counters 58*a–c*. The load inputs of the counters 58*a–c* are coupled to $V_{cc}$ via pull-up resistor 60. The outputs of the counters are coupled to respective inverters 62, thereby producing the 1's complement of the output of the counters 58*a–c*. The output of the inverters 62 are coupled to respective inputs of counters 64*a–c*. The 4*MAX_CLOCK signal is coupled to the clock inputs of counters 64*a–c*. The SOS signal is coupled to the load inputs of the counters 64*a–c*. The CLEAR inputs of the counters 64*a–c* are coupled to a RESET signal provided by the control circuitry of the laser printer. The F_LSYNC signal is coupled to the preset input of D flip-flop 66 via inverter 68. The Q output of D flip-flop 66 is coupled to the T and P inputs of counter 64*a* and to the P inputs of counters 64*b* and 64*c*. The ripple carry output of counter 64*a* is coupled to the T input of counter 64*b*; the ripple carry output of counter 64*b* is coupled to the T input of counter 64*c*. The Q3 output of counter 64*c* is coupled to the clock input of flip-flop 66 via inverter 70. The D input of flip-flop 66 is coupled to $V_{cc}$ via pull-up resistor 72. The Q output of flip-flop 66 (the LMEND signal) is coupled to $V_{cc}$ via pull-up resistor 74. The CLEAR input of flip-flop 66 is coupled to the SOS signal.

Figure 7:
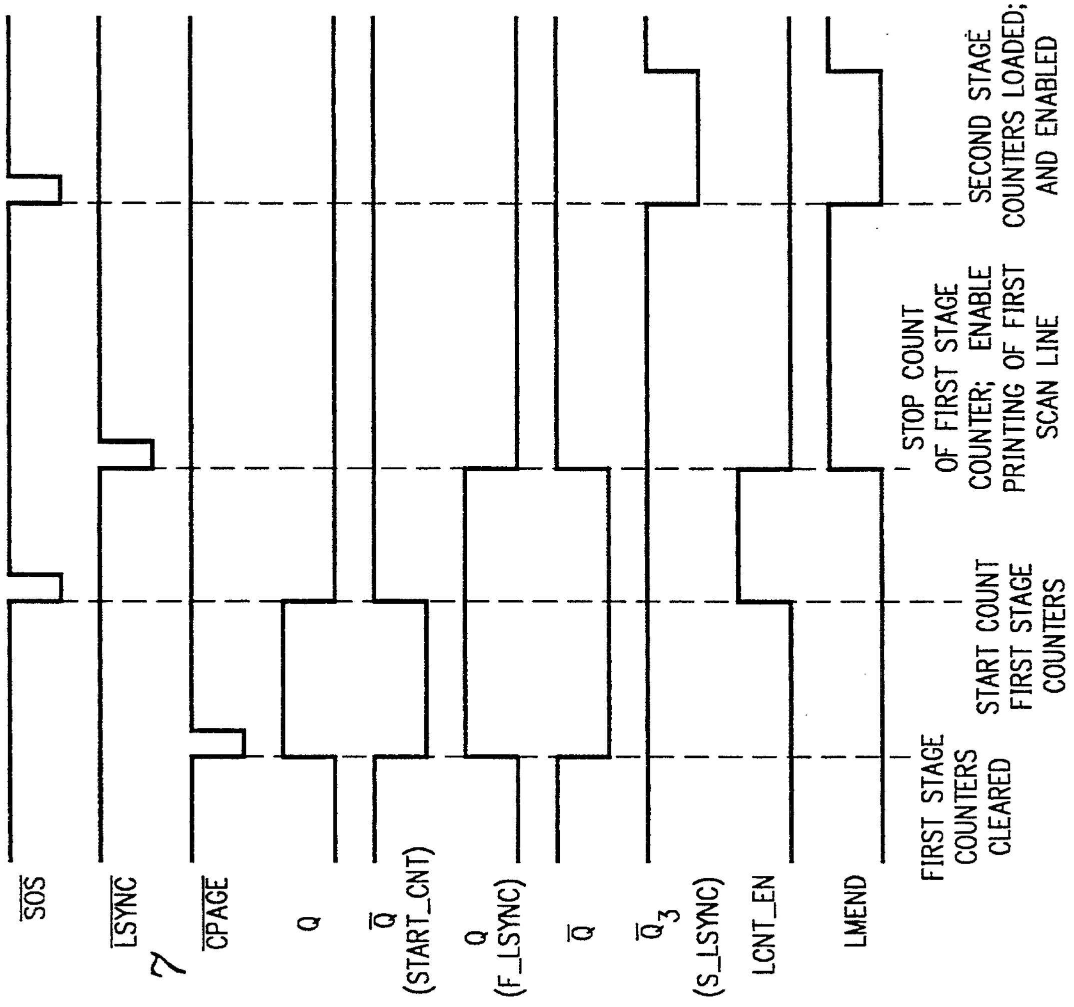
FIG. 7 illustrates a timing diagram for the circuit of FIG. 6.

Operation of the circuit of FIG. 6 is best understood in connection with the timing diagram of FIG. 7. Responsive to a pulse by the CPAGE signal, the counters 58*a–c* are cleared, the Q outputs of flip-flops 48 and 50 are set to "1" and the Q outputs are set to "0". Upon a pulse on the SOS signal, the Q output of flip-flop 48 transitions low, thereby forcing the output of XOR gate 56 (LCNT_EN) high. The LCNT_EN signal remains high until the LSYNC signal is pulsed, thereby forcing the Q output of the flip-flop 50 low, and consequently forcing the LCNT_EN signal low. When the LCNT_EN signal is high, counters 58*a–c*, which are connected to form a 12-bit counter, are enabled to count at the frequency given by the 4*MAX_CLOCK signal. When LSYNC is pulsed, the Q output of flip-flop 66 is forced high, thus generating a high LMEND signal. The LMEND signal starts the printing for each scanned line. The LMEND signal remains high until the subsequent SOS signal is pulsed, which triggers the clear input of flip-flop 66, bringing the LMEND signal low. Simultaneously, the second stage counters 64*a–c* are loaded with the outputs of inverter 62 (i.e., the 1's complement of the output of counters 58*a–c*) and the counters 64*a–c* are enabled to count at the rate provided by the 4*MAX_CLOCK signal. When the count reaches zero, the Q3 output of counter 64*c* will transition low, thereby clocking D flip-flop 66 and forcing the LMEND signal high. This signal starts the second scanline for the page. Subsequent scanlines are repeated by preloading the counters 64*a–c* and counting to zero. The cycle continues until CPAGE is enabled, at which time the flip-flops 48, 50 and 66 are reset.

While the present invention has been described herein as using a clock frequency (4*MAX_CLOCK) which is four times the frequency driving the laser, a fixed rate clock which was four times the frequency at the highest resolution could also be used, which will increase the relative accuracy at lower print resolutions. Also, the desired left margin resolution could be varied, i.e., a factor such as 3x or 8x could be used rather than the factor of 4x described herein. Furthermore, while the invention has been described in connection with laser print engines, it could be used with other engines, such as ink-jet print engines, which use a similar positioning mechanism in which the printing medium (the laser for a laser print engine and the print head for an ink-jet printer) can be timed between a determinable sensing location and the desired start of the scanline.

Although the present invention and its advantages have been described in detail, it should be understood that various changes, substitutions and alterations can be made herein without departing from the spirit and scope of the invention as defined by the appended claims.

What is claimed is:

1. Circuitry for use with a print engine for precisely aligning the margin at which printing is enabled along a scanline, said print engine comprising a printing medium for generating an image on the scanline, a sensor for generating a first signal responsive to detection of said printing medium at a first location on the scanline and circuitry for generating a second signal indicating movement of the printing medium to a second location on the scanline indicative of a preset margin for the print engine, comprising:

circuitry for generating a number responsive to receiving said first and second signals during operation of the print engine, said number indicative of the elapsed time between the first and second signals; and circuitry, coupled to said number generating circuitry, for generating a start signal for enabling printing responsive to said first signal and said generated number.

2. The circuitry of claim 1 and further comprising circuitry for receiving a signal indicative of a new page and wherein said start signal generating circuitry comprises circuitry for generating a start signal responsive to said second signal for the first scanline of a new page.

3. The circuitry of claim 2 wherein said number generating circuitry comprises counter circuitry for counting at a predetermined frequency responsive to said first and second signals.

4. The circuitry of claim 3 wherein said predetermined frequency is dependent upon the print resolution.

5. The circuitry of claim 3 wherein said predetermined frequency is a fixed frequency.

6. The circuitry of claim 3 wherein said number generating circuitry further comprises circuitry for detecting said new page signal such that the counter circuitry is enabled for the first scanline of each page and disabled for subsequent scanlines of such page.

7. The circuitry of claim 1 wherein start signal generating circuitry comprises counter circuitry for counting at a predetermined frequency responsive to said first signal and for generating the start signal.

8. The circuitry of claim 7 wherein said counter circuitry comprises presettable counters.

9. The circuitry of claim 8 and further comprising logic circuitry for generating the 1's complement of said generated number and loading said 1's complement of said generated number into said presettable counters.

10. The circuitry of claim 1 wherein said printing medium is a laser beam.

11. The circuitry of claim 1 wherein said printing medium is an ink jet head.

12. A printer comprising:

a print engine comprising:

a printing medium for generating an image on a scanline;

a sensor for generating a first signal responsive to detection of said printing medium at a first location on the scanline; and circuitry for generating a second signal responsive to movement of the printing medium to a predetermined second location on the scanline;

circuitry for generating a number responsive to receiving said first and second signals during operation of the print engine, said number indicative of the elapsed time between the first and second signals; and circuitry, coupled to said number generating circuitry, for generating a start signal for enabling printing responsive to said first signal and said generated number.

13. The circuitry of claim 12 and further comprising circuitry for receiving a signal indicative of a new page and wherein said start signal generating circuitry comprises circuitry for generating a start signal responsive to said second signal for the first scanline of a new page.

14. The circuitry of claim 13 wherein said number generating circuitry further comprises circuitry for detecting said new page signal such that the number generating circuitry is enabled for the first scanline of each page and disabled for subsequent scanlines of such page.

15. The circuitry of claim 12 wherein start signal generating circuitry comprises counter circuitry for counting at a predetermined frequency responsive to said first signal.

16. The circuitry of claim 15 wherein said counter circuitry comprises presettable counters.

17. The circuitry of claim 16 and further comprising logic circuitry for generating the 1's complement of said generated number and loading said 1's complement of said generated number into said presettable counters.

18. A method of precisely aligning a margin on a print engine scanline, comprising the steps of:

generating number responsive to receiving first and second signals during operation of a print engine, said number indicative of the elapsed time between first and second signals generated by the print engine indicative of movement of said printing medium to first and second positions along the scanline, respectively; and generating a start signal to enable printing responsive to receiving the first signal after delaying a number of cycles corresponding to said generated number.

19. The method of claim 18 and further comprising the steps of receiving a signal indicative of a new page and generating the start signal responsive to the second signal for the first scanline of the new page.

20. The method of claim 19 wherein said number generating step comprises counting at a predetermined frequency responsive to the first signal until the second signal is received.

21. The method of claim 20 wherein said step of counting at a predetermined frequency comprises the step of counting at a predetermined frequency dependent upon the print resolution.

22. The method of claim 20 wherein said step of counting at a predetermined frequency comprises the step of counting at a fixed predetermined frequency dependent upon the maximum print resolution.

23. The method of claim 20 wherein said number generating step further comprises the steps of detecting the new page signal and enabling counting at the predetermined frequency for the first scanline of each new page.

24. The method of claim 18 wherein said start signal generating step comprises the step of counting at a predetermined frequency responsive to said first signal.

25. The method of claim 24 and further comprising the step of generating the 1's complement of the generated number.

26. The method of claim 25 wherein said counting step comprises the step of counting at the predetermined frequency starting at said 1's complement of the generated number.

27. Apparatus for controlling a print engine, said print engine including circuitry for outputting one or more signals indicative of a margin, comprising:

timing circuitry for receiving said one or more signals for a first line on a page at a predetermined resolution and generating timing information responsive to the elapsed time defined by said one or more signals; and circuitry responsive to said tinning information for automatically generating control signals for duplicating said margin for subsequent lines on said page.

28. The control apparatus of claim 27 and further comprising circuitry for resetting said margin responsive to a control signal.

29. The control apparatus of claim 27 wherein said circuitry responsive to said one or more signals comprises counting circuitry operating at a multiple of a clock associated with said print engine.

30. The control apparatus of claim 29 wherein said multiple is dependent upon a desired resolution.

31. The control apparatus of claim 27 wherein said print engine is a laser engine.

32. A method of controlling a print engine, said print engine outputting one or more signals indicative of a margin, comprising the steps of:

timing said one or more signals defining said margin for a first line on a page at a predetermined resolution to generate timing information; and automatically generating control signals for duplicating said first line margin for subsequent lines on said page responsive to said generated timing information.

33. The method of claim 32 and further comprising the step of resetting said margin responsive to a control signal.

34. The method of claim 32 wherein said generating step comprises the step of timing said one or more signals at a frequency which is a multiple of a clock associated with said engine.

35. The method of claim 34 wherein said timing step comprises the step of timing said one or more signals at a multiple dependent upon a desired resolution.

36. The method of claim 32 wherein said print engine is a laser engine.

* * * * *

UNITED STATES PATENT AND TRADEMARK OFFICE

CERTIFICATE OF CORRECTION

PATENT NO. : 5,450,121

DATED : September 12, 1995

INVENTOR(S) : Gregory K. Adams

It is certified that error appears in the above-indentified patent and that said Letters Patent is hereby corrected as shown below:

Col. 5, ln. 6, delete "SOS", insert --$\overline{SOS}$--.

Col. 5, ln. 6, delete "LSYNC", insert --$\overline{LSYNC}$--.

Col. 5, ln. 14, delete "Q", insert --$\overline{Q}$--.

Col. 5, ln. 23, delete "CPAGE", insert --$\overline{CPAGE}$--.

Col. 5, ln. 24, after 58a-c, insert a period.

Col. 5, ln. 33, delete "SOS", insert --$\overline{SOS}$--.

Col. 5, ln. 38, delete "Q", insert --$\overline{Q}$--.

Col. 5, ln. 48, delete "SOS", insert --$\overline{SOS}$--.

Col. 5, ln. 53, delete "Q", insert --$\overline{Q}$--.

Col. 8, ln. 44, delete "tinning", insert --timing--.

Signed and Sealed this

Thirtieth Day of January, 1996

Attest:

BRUCE LEHMAN

*Attesting Officer* *Commissioner of Patents and Trademarks*